Oct. 15, 1957     G. J. CONSTANTIKES     2,809,821
VAPOR LIQUID CONTACTING APPARATUS
Filed Oct. 23, 1953
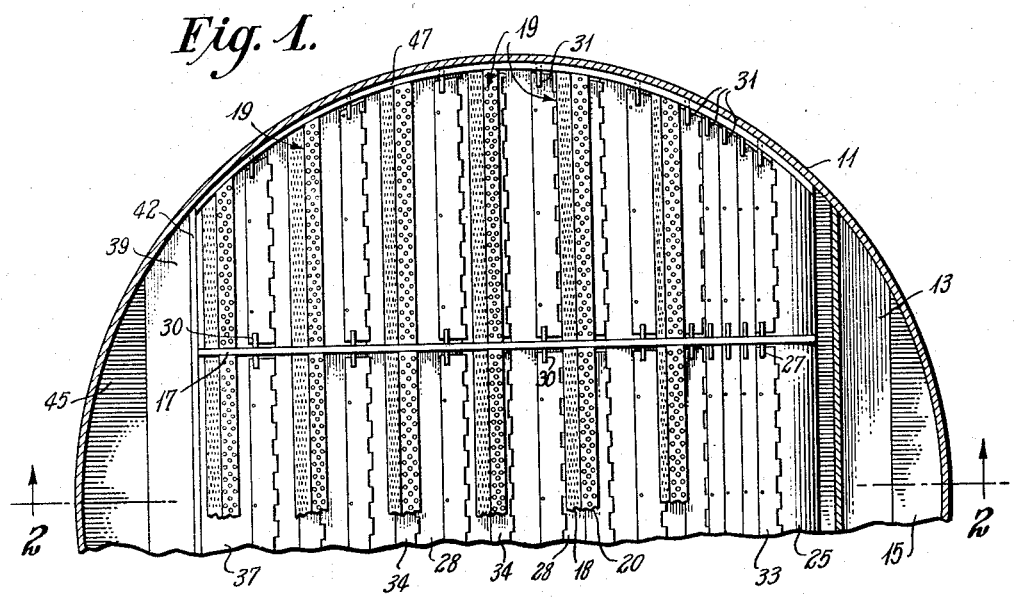
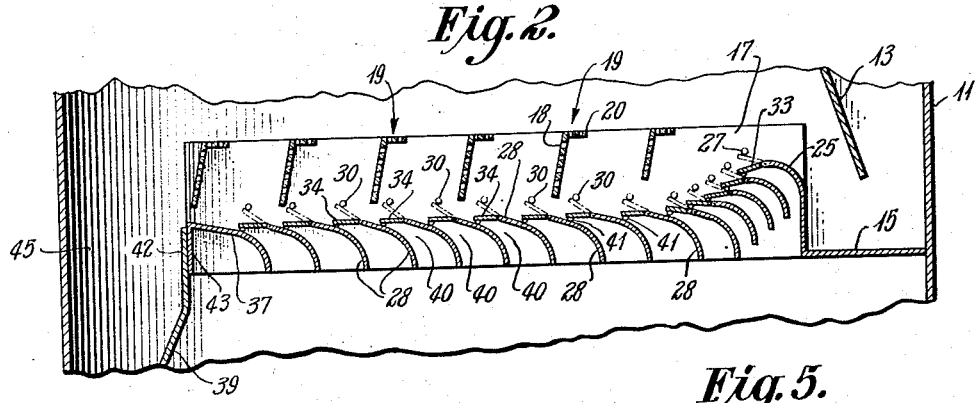
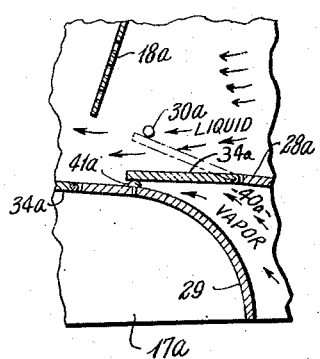
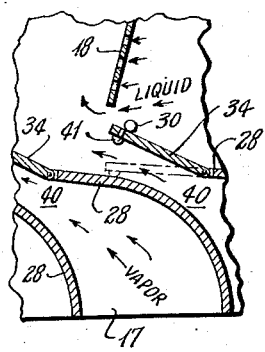
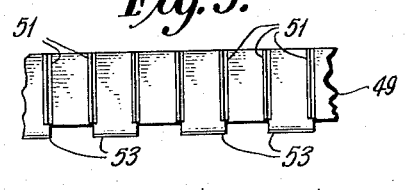
INVENTOR.
*G. J. Constantikes*
BY
*Hudson & Young*
ATTORNEYS United States Patent Office 2,809,821
Patented Oct. 15, 1957

2,809,821

VAPOR LIQUID CONTACTING APPARATUS

George J. Constantikes, Bartlesville, Okla., assignor to Phillips Petroleum Company, a corporation of Delaware Application October 23, 1953, Serial No. 387,997

3 Claims. (Cl. 261—114)

This invention relates to vapor liquid contacting apparatus. In one aspect it relates to vapor liquid contacting apparatus which is relatively simple and useful in applications in which vapor load in a vapor-liquid contacting apparatus varies within wide limits.

In conventional bubble cap column operations wherein vapors pass upward through liquid on bubble cap trays, distribution of liquid throughout the extent of a tray is frequently not uniform and vapor flow through small depths of liquids is frequently much greater than the vapor flow through thicker depths of liquid on the same tray. I have devised a vapor-liquid contacting apparatus in which the flow of vapor is never closed off and vapor flow can vary between exceptionally wide limits.

An object of my invention is to provide a vapor-liquid contacting apparatus which is useful in a wide variety of vapor-liquid contacting applications.

Another object of my invention is to provide a vapor-liquid contacting apparatus which is relatively simple to construct and install in a vapor-liquid contacting column.

Still another object of my invention is to provide a flexible vapor-liquid contacting apparatus which has utility over wide ranges of vapor loadings.

Still other objects and advantages of my invention will be realized upon reading the following disclosure which taken with the attached drawing respectively describes and illustrates preferred embodiments of my invention.

I have devised an improvement for use with a cascade type of liquid-vapor contacting tray which is especially adaptable for wide ranges in vapor loadings by providing a variable orifice or slot opening for use with such vapor slot contacting equipment. The variable slot opening is accomplished by hinging the vapor outlet end of each of the vapor guide members so that the hinged element can open as vapor loading increases without causing undue vapor velocities within the liquid being contacted.

In the drawing,

Figure 1 is a cross-sectional view of a portion of a vapor-liquid contacting column embodying elements of my invention.

Figure 2 is a cross-sectional view taken on the line 2—2 of Figure 1.

Figure 3 is a cross-sectional view of another embodiment of apparatus of my invention.

Figure 4 is a cross-sectional view of still another embodiment of my invention.

Figure 5 is a plan view looking upward toward one embodiment of hinged baffle plate of my invention.

Figure 6 is a side elevational view of the apparatus of Figure 5.

Referring now to the drawing and specifically to Figure 1, reference numeral 11 identifies the cylinder wall of an elongated vessel in which vapor-liquid contacting apparatus of my invention is installed. Element 13 is a downspout baffle plate leading from a vapor-liquid contacting tray, not shown, disposed above the contacting tray illustrated in Figure 2. Reference numeral 15 identifies the bottom wall or floor of the liquid feed trap directing liquid feed to a fractionating tray. One or more plates 17 are disposed across the vessel as illustrated in Figure 1 mainly for support purposes. Baffle plates 19 are used for retarding liquid flow across the tray from right to left and these baffles are attached rigidly to the one or more support plates 17 and to a circular plate 47 in case the baffle extends from one of the plates 17 to the side wall of the vessel 11. These perforate baffles 19 are composed of two portions, one portion 18 is sloping in such a manner that its lower edge is a little further away from the point of liquid inlet to the tray than its top. This portion 18 is intended to restrict liquid flow across the tray and to cause an abrupt change in direction of vapor flow upon issuing from vapor passages 40. The horizontal portion 20 of the perforate baffle 19 is provided mainly for structural purposes. A vapor guide plate 25 positioned nearest the liquid feed trap 15 is higher than any of the other vapor guide members and serves as a weir over which liquid feed to the tray flows. The uppermost portion of the vapor guide plate 25 should be higher than the lower end of the downspout baffle member 13 so that vapor cannot flow upward around the lower end of this baffle member. On the upper end of the vapor guide plate 25 is disposed a hinged baffle plate member 33 as illustrated. This hinged baffle plate 33 is intended to open widely the vapor passageway between this vapor guide plate and the next one under conditions of high vapor loading. In order that the hinged baffle plate member 33 cannot be thrown over and against the upper surface of the vapor guide plate 25, a pin or stop element 27 is held rigidly by the support plate member 17. Under conditions of very high vapor loading the hinged baffle plate 33 opens its maximum extent and touches the pin 27 and upon a decrease in vapor loading plate 33 drops to some intermediate position by gravity. In the central portion of the vapor-liquid contacting tray, as shown in Figure 2, vapor guide plates are identified by reference numeral 28. Each of these vapor guide plates is provided with a hinged baffle plate 34. These plates have their upper movement limited by the presence of a stop pin element 30 supported by the support plate 17. On the under side of each hinged baffle plate 34 is provided a small lug element 41 which is intended to touch the next successive vapor guide plate so that some vapor passage will always be provided between the edge of the hinged baffle element and the next adjacent vapor guide plate. All of the hinged baffle plates 33 and 34 of Figures 1 and 2 are provided with lugs similar to lugs 41 extending below the under surface of the hinged baffles. At the left hand end of the vapor-liquid contacting tray is a vapor guide member 37 which is not provided with a hinged baffle element and this baffle plate 37 is merely intended to cooperate with the next hinged baffle to its right. At the left of the vapor guide 37 is disposed a plate member 43 to serve as a support for the guide plate 37 and to assist in supporting an upper portion 42 of the downspout plate element 39. Space 45 is the downspout space in which liquid flows to a next lower tray assembly.

In Figure 1 of the drawing, the perforate baffle members 19 which extend between the support plate 17 and the walls of the vessel, are shown as being attached to a plate member 47 which is disposed part way around the inner circumference of vessel 11. In this case the pin members 31 stop the upward movement of the hinged baffle plates 34 and these pins are attached rigidly to this circular plate member 47. Since such vapor-liquid contacting apparatus as herein described is frequently symmetrical with respect to a vertically plane only approximately half of the plan view of the contacting tray is shown in Figure 1.

In Figure 3, which is a sectional view of a portion of the contacting tray of Figures 1 and 2, on an enlarged scale, the construction and operation of the hinged plate baffles of my invention can be more easily seen. In Figure 3, vapor guide plates 28 are provided with hinged baffle plates 34 as shown. It is readily seen that as the hinged baffle plates 34 are opened the vapor passages 40 are made larger to accommodate passage of larger volumes of vapor. Thus, it is possible to pass much larger volumes of vapor through such adjustable vapor passages without much increase in pressure drop across the treating column. Stop pins 30 are shown as limiting the upper movement of the end of the baffles 34. In order that the hinged members 34 cannot completely close off the flow of vapor, the lugs 41 are attached to the baffles in a manner similar to a rivet. The heads of these rivet elements are enlarged somewhat and serve as lugs to hold the hinged baffles open at least a slight extent under low vapor flow conditions. In Figure 4 is shown a portion 18a of a perforate baffle and portions of several vapor guide plates 28a and 29. To these plates are attached hinged baffles 34a. Instead of attaching spacing lugs to the underside of these hinged baffle members 34a, I have shown a lug 41a attached to a vapor guide plate 29 on its upper side in such a manner that the hinged baffle plate 34a (attached to plate 28a) is held open at least to the slight extent under low vapor load conditions. The operation of the lug when attached to the upper surface of member 29 is substantially the same for directing vapor flow passage 40a as when the lug is attached to the underside of a hinged plate member as member 34 of Figure 3. A pin 30a limits the rotational movement of hinged baffle 34a.

In Figure 5 of the drawing is illustrated another type of structure which serves as a means of preventing close contact of the hinged baffle plates with a next vapor guide plate. This latter construction comprises ridges 51 attached to the underside of a hinged baffle plate 49, the hinges of which are identified by reference numeral 53. An end view of these ridges may be seen on reference to Figure 6. Likewise, ridges similar to ridges 51 of Figures 5 and 6 may in place of being provided on the underside of the hinged baffle plate be provided on the upper surfaces of the vapor guide members such as vapor guide plates 28, 29 and 37.

The several vapor guide plates adjacent vapor guide plate 25 are disposed at levels above the level of the main assembly of vapor guide plates 28 for the purpose of decreasing the depth of liquid as it flows onto the vapor-liquid contacting elements of my tray. Thus the liquid load on all parts of the tray is about the same thereby assisting in maintaining equal vapor flow through all sections of the tray.

It should be noted that as vapor load increases the hinged baffle plates 34, of Figures 1 and 2, open more and more thereby permitting free flow of vapor without excessive vapor velocities. Thus, the pressure drop across a tray is less, the lower the vapor velocity, other conditions being equal.

It should be noted that the direction of the flow of vapor between these vapor guide elements is from right to left and that is the same direction of flow of liquid across the tray. The flow of vapor through the spaces between the hinged baffle plates and the vapor guide members is intended to act at least somewhat as venturis and thereby give more vigorous contacting between vapor and liquid. Then rapidly flowing vapor streams with entrained liquid are impinged against one or more of the perforate baffle members 19. These baffle members restrict liquid flow across the tray in such a manner that there is always maintained a substantial depth of liquid undergoing contacting with vapor even without the use of a conventional weir at the discharge side of the tray. The perforations in these perforate baffle members allow some vapor and liquid passage therethrough to expedite vapor-liquid contacting.

Any suitable type of hinge for allowing free movement of the hinged baffle plates 34 can be used. I have illustrated the hinges as being of the piano type which does not have raised portions extending on either side of the elements being hinged so that there can be no obstruction whatever to the flow of vapor.

Materials of construction of the vapor-liquid contacting apparatus of my invention are, in general, selected from among those commercially available taking into consideration corrosive properties of the materials undergoing treatment. For example, in a natural gasoline absorption operation, ordinary iron or steel can generally be used. In case high concentrations of hydrogen sulfide or other corrosive elements are present, it is preferable to use corrosion resistant materials. In chemical industries, it may be necessary to use such corrosion resistant materials as Monel metal, stainless steel, copper or brass depending, of course, upon the particular corrosive material.

The vapor-liquid contacting apparatus of my invention can be used in substantially any vapor-liquid contacting operation in which intimate contacting between vapor and liquid is required. It is applicable to conventional fractional distillation of, as for example, hydrocarbon mixtures. It can be used in the absorption of soluble constituents from gases involving treatment with a liquid, such as natural gasoline absorption. It can also be used in dehydrating operations in which a liquid dehydrating agent, for example, ethylene glycol is contacted with moisture containing gases. It can also be used in such operations as amine treaters for removing hydrogen sulfide and/or carbon dioxide or other acidic gas from mixtures containing them. It can also be used in stripping operations in which dissolved gases are stripped from liquids containing them in solution. Many other applications of my vapor-liquid contacting apparatus will be realized by those skilled in the art.

By using the hinged baffle plates of my invention in cooperation with the vapor guide plates, I am able to carry out vapor-liquid contacting at high vapor rates without undue formation of fine mist, thus eliminating need for mist extractors. Likewise, the absence of formation of mist or larger size liquid droplets such as would be carried from one liquid contacting tray to another higher up in the column eliminates contamination of liquid from one tray with liquid from a lower tray. Also the use of my hinged baffle plates allows the column to operate under heavy vapor loads without undue increases in pressure drop across the contacting column.

It is obvious that as many tray assemblies, as disclosed herein, can be used in a vapor-liquid contacting vessel as desired. The number used, will of course, depend upon the extent of contacting desired. In a fractional distillation tower, 10, 20, 30 or more of the tray assemblies can be used. In the case of such a fractionator, it will be understood by those skilled in the art that a vapor withdrawal pipe will need be provided at the top of the column for removal of the overhead vapor product. A feed pipe for introduction of feed material to be fractionated is provided at a suitable level, and feed is introduced into one of the downspout spaces, as space 45 of Figure 2. Provision is also made for use of reflux, withdrawal of bottom product, and for removal of an intermediate product as a side stream, if desired. Process control apparatus such as float controllers, pressure and temperature indicators, recorders and controllers as well as feed and reflux inlet controllers are used as desired with a column equipped with my liquid-vapor contacting trays.

While certain embodiments of the invention have been described for illustrative purposes, the invention obviously is not limited thereto.

I claim:
1. In a column for contacting liquid with a vapor, a vapor-liquid contacting tray assembly comprising, in combination, a plurality of vapor flow producing means for producing a plurality of generally horizontally flowing mutually parallel sheets of vapor, means for introducing liquid from a higher point in said column to said tray assembly in the direction of flow of said parallel sheets of vapor, means for passing liquid from the side of said tray assembly opposite its point of introduction to said tray assembly to a next lower tray assembly, said vapor flow producing means each comprising a pair of adjacent elongated curved vapor guide baffles having their elongated axes disposed horizontally and perpendicular to the direction of flow of liquid across said tray, an elongated movable vapor flow plate hinged along one elongated edge to the upper elongated edge of one of said curved vapor guide baffles in such a manner that in normal operating position said hinged vapor flow plate constitutes an extension of the vapor guide baffle to which it is hinged to maintain the vapor flowing in the above-mentioned direction between said hinged vapor flow plate and the other curved vapor guide baffle of said pair, a spacing means attached to one of said hinged vapor flow plate and said other curved vapor guide baffle, said spacing means being disposed intermediate said hinged vapor flow plate and said other curved vapor guide baffle in such a manner as to hold open said hinged vapor flow plate with respect to said other vapor guide baffle under conditions of low column vapor loading, and said hinged vapor flow plate being adapted to open to greater degrees to permit outflow of a thicker sheet of vapor at higher vapor loadings in said column.

2. In a column for contacting liquid with a vapor, a vapor-liquid contacting tray assembly comprising, in combination, a plurality of vapor flow producing means for producing a plurality of generally horizontally flowing mutually parallel sheets of vapor, means for introducing liquid from a higher point in said column to said tray assembly in the direction of flow of said parallel sheets of vapor, means for passing liquid from the side of said tray assembly opposite its point of introduction to said tray assembly to a next lower tray assembly, said vapor flow producing means each comprising a pair of adjacent elongated curved vapor guide baffles having their elongated axes disposed horizontally and perpendicular to the direction of flow of liquid across said tray, an elongated movable vapor flow plate hinged along one elongated edge to the upper elongated edge of one of said curved vapor guide baffles in such a manner that in normal operating position said hinged vapor flow plate constitutes an extension of the vapor guide baffle to which it is hinged to maintain the vapor flowing in the above-mentioned direction between said hinged vapor flow plate and the other curved vapor guide baffle of said pair, a spacing lug attached to one of said hinged vapor flow plate and said other curved vapor guide baffle, said spacing lug being disposed intermediate said hinged vapor flow plate and said other curved vapor guide baffle in such a manner as to hold open said hinged vapor flow plate with respect to said other vapor guide baffle under conditions of low column vapor loading and said hinged vapor flow plate being adapted to open to greater degrees to permit outflow of a thicker sheet of vapor at higher vapor loadings in said column.

3. In a column for contacting liquid with a vapor, a vapor-liquid contacting tray assembly comprising, in combination, a plurality of vapor flow producing means for producing a plurality of generally horizontally flowing mutually parallel sheets of vapor, means for introducing liquid from a higher point in said column to said tray assembly in the direction of flow of said parallel sheets of vapor, means for passing liquid from the side of said tray assembly opposite its point of introduction to said tray assembly to a next lower tray assembly, said vapor flow producing means each comprising a pair of adjacent elongated curved vapor guide baffles having their elongated axes disposed horizontally and perpendicular to the direction of flow of liquid across said tray, an elongated movable vapor flow plate hinged along one elongated edge to the upper elongated edge of one of said curved vapor guide baffles in such a manner that in normal operating position said hinged vapor flow plate constitutes an extension of the vapor guide baffle to which it is hinged to maintain the vapor flowing in the above-mentioned direction between said hinged vapor flow plate and the other curved vapor guide baffle of said pair, a spacing ridge attached to one of said hinged vapor flow plate and said other curved vapor guide baffle, said spacing ridge being disposed intermediate said hinged vapor flow plate and said other curved vapor guide baffle in such a manner as to hold open said hinged vapor flow plate with respect to said other vapor guide baffle under conditions of low column vapor loading, and said hinged vapor flow plate being adapted to open to greater degrees to permit outflow of a thicker sheet of vapor at higher vapor loadings in said column.

References Cited in the file of this patent

UNITED STATES PATENTS

| Number | Name | Date |
|---|---|---|
| 948,432 | Rudeen | Feb. 8, 1910 |
| 1,097,879 | Reichard | May 26, 1914 |
| 2,061,830 | Campbell | Nov. 24, 1936 |
| 2,658,737 | Nutter | Nov. 10, 1953 |
| 2,681,219 | Thrift et al. | June 15, 1954 |
| 2,757,915 | Huggins | Aug. 7, 1956 |

FOREIGN PATENTS

| Number | Country | Date |
|---|---|---|
| 874,509 | France | May 4, 1942 |
| 1,048,712 | France | Aug. 5, 1953 |